United States Patent Office 3,037,838
Patented June 5, 1962

3,037,838
METHOD OF PREPARING GRANULATED CONDENSED PHOSPHATE PEROXYHYDRATE
Kurt Lindner, Berlin-Lichterfelde, Germany, assignor to Hagan Chemicals & Controls, Inc., Pittsburgh, Pa.
No Drawing. Filed July 3, 1958, Ser. No. 746,322
4 Claims. (Cl. 23—14)

With the importance at present of the condensed phosphates in the manufacture of washing agents, washing liquids, soaking agents, rinsing agents as well as cleaning agents for domestic uses, as well as for the trade and industrial uses, the corresponding phosphate peroxyhydrates have also acquired an increased importance. The latter have the advantage over other peroxyhydrates (for example perborates, percarbonates), of combining the action of the condensed phosphates with the active oxygen of the per-compound.

The manufacture of washing- and cleaning-agents commonly used today in the form of hollow globules or also in the form of granules, causes difficulties during the subsequent admixture of phosphate peroxyhydrates in the usual powdery or finely crystalline form, in as much that as a result of the different sizes of the grains, a separation into the individual components of the mixture readily appears. Furthermore, the light, hollow-spherical or granulated components dissolve in water much more rapidly than the powdery or finely crystalline phosphate peroxyhydrates in the usual state, and besides, the latter have a tendency to dust-formation as well as to a formation into clumps on dissolving.

It is known that phosphtae peroxyhydrates are obtained by conversion of the condensed phosphates in an aqueous solution as well as in the dry state, with hydrogen peroxide. Usually crystalline peroxyhydrates are however formed from the aqueous solution, and these are of greater specific gravity even in the ground state. By spraying condensed phosphates with solutions of hydrogen peroxide, powdery peroxyhydrates are usually formed, as long as the starting phosphates were not present in a granulated form. These methods already known, are not the subject of the present invention.

It has been found, that by spraying a jet of concentrated hydrogen peroxide solution on to the calcined condensed phosphates which can be present in the usual powdery form or in a finely crystalline state, the formation of phosphate peroxyhydrates in granular form takes place, as long as this conversion is carried out in a mixer with a continuous, preferably slow motion. The spraying with the jet is to be carried out in such a way, that per mol of condensed phosphate, 0.5 to 2.5 mols $H_2O_2$ are bound in an additive manner.

The heat of the reaction which depends partly on the peroxyhydrate formation and partly on the hydrate formation taking place simultaneously, can be removed either by the addition of a stream of cold air, or by other cooling devices, for example the circulation of cooling water, or cooling floors in cooling jackets of the mixer, or in hollow-constructed stirring-systems. It may however also be desired to use the heat of reaction for the removal of the combined hydrate water, or even to use it for the removal of the water of crystallization during the conversion or immediately following it, by means of supplying heat in the form of a drying process.

Suitable mixing apparatuses are for example vertically or horizontally fitted mixers provided with slow-operating stirring- or blade-devices, which have built-in spraying devices for the jet of hydrogen peroxide solution, which are capable of projecting a very fine spray of the latter on to the continuously moving phosphate powder. Other mixing devices can also be used, as for example rotating mixing drums, air-mixers operating by a whirling motion, or such like. Most suitably, continuously working mixers are used which allow the continuous removal for example by means of a screw conveyor, of the phosphate peroxyhydrate formed by the spraying process.

In view of the fact that in the manufacture of washing and cleaning agents in a hollow spherical form, for example by the hot-spray process, or also in a granulated form, it is usual to obtain definite sizes of the grains of about 0.1 to 1 mm., it is advisable also to adjust the granules of the peroxyhydrates of the condensed phosphates to the corresponding sizes of the grains, in order to avoid during the combination, a separation into the individual components. Definite grain-sizes of the phosphate peroxyhydrate granules are obtained by sorting or sifting methods of the type which are known already. It is readily possible to join on to the device for the granule- or pellet-formation, a sifting process, either in the continuous manufacturing process, or in the discontinuous operation of feeding charges. Such a sifting process would consist in squeezing the granules for example by means of rotating brushes, through sieves of certain widths of mesh, and thereby to distribute them into various definite sizes of grains.

For carrying out the method described, alkaline pyrophosphates are particularly suitable, and amongst them the disodium- and tetrasodium pyrophosphate in a finely crystalline or finely powdered form. It is quite easy for 1 mol of pyrophosphate to take up 2 to 2.5 mols $H_2O_2$ in an additive manner. Sodium tripolyphosphates as well as higher molecular condensed phosphates are also suitable. If a dehydration process is to be dispensed with, it is advisable to use the polyphosphate in a mixture together with calcined pyrophosphate, as in this way the water content of the concentrated hydrogen peroxide solutions is bound in the form of water of hydration, and dry granules are formed.

Mixtures which have been found to be particularly favourable, also from the technical point of view of their use, are mixtures of sodium pyrophosphates and sodium tripolyphosphate, as well as those of sodium pyrophosphates, sodium tripolyphosphate and higher molecular polyphosphates of sodium. The higher molecular polyphosphates which correspond in their average composition to a hexy- or hepta-polyphosphate, are particularly well suited because of their stabilizing action. In this way mixtures can be used for example, of 50 to 75% disodium- or tetrasodium-pyrophosphate with 50 to 25% sodium tripolyphosphate, or mixtures of equal parts of the sodium pyrophosphates, of the sodium tripolyphosphate and of the higher sodium polyphosphates of an average composition corresponding to that of a hexa- or hepta-polyphosphate.

A favourable effect is exerted by the presence of stabilizers such as magnesium sulphate, magnesium metasilicate, magnesium polysilicate, the alkaline salts of amino-polycarboxylic acids (e.g. E.D.T.A.), protein products, protein hydrolysates, fatty acid- or sulphonic acid-protein condensation products or such like. For this it is possible either to add the stabilizers to the phosphate mixture, or to dissolve them in the hydrogen peroxide solution. Effective stabilizers can also be obtained by forming them at the same time as the granules. As an example the possibility is mentioned, of mixing the condensed phosphates with magnesium sulphate in a calcined or crystalline form, while water glass is added to the hydrogen peroxide solution. In this instance the addition can be so measured, that 3 to 4% magnesium polysilicate are formed in the finished granules.

Other additions can also be made use of, as for example strengthening agents of the type of carboxymethyl cellulose.

A further possibility for stabilizing the granules, is the regulation of the alkalinity of the end-product by the use of compounds which decrease the pH-value. This can already be done in the phosphate mixture, for example by adding acid disodium-pyrophosphates. Compounds which lower the pH can however also be present in the phosphate mixture or in the hydrogen peroxide. Dry compounds are preferably used for the phosphate mixture, such as acid salts or solid organic or inorganic acids. As examples, sodium bisulphate, oxalic acid or amino-sulphonic acid may be mentioned. Acid salts or acids can also be dissolved in the hydrogen peroxide. Phosphoric acids are particularly suitable, such as orthphosphoric acids, pyrophosphoric acids, or polyphosphoric acids, for example poly-meta phosphoric acid. Out of these, the latter have the advantage of preventing any foreign substances from entering the phosphate peroxyhydrate.

Another form of carrying out the process consists in mixing the condensed alkaline phosphates with up to 10% alkaline carbonate or alkaline bicarbonate before the beginning of the granulation process, and using then a hydrogen peroxide solution containing a quantity of acid which corresponds to that required for the liberation of the carbonic acid from the carbonates mentioned. In this case too, any one acid can be used, although for reasons already mentioned, the acids of phosphorus, in particular the pyrophosphoric acids or the polyphosphoric acids are preferred. In this form of execution, the carbonic acid formed during the granulation process has the effect of loosening the granules and giving them thereby a porous structure and a better solubility in water.

The following few examples illustrate the character of the invention:

(1) 100 parts by weight of calcined powdery tetrasodium pyrophosphate are well mixed with 2 parts by weight of the sodium salt of ethylene diamino tetraacetic acid. This mixture is then finely sprayed for 2 to 3 hours being continuously slowly stirred by a blade-agitator, with 43 parts by weight of a 30% solution of hydrogen peroxide. The mixing vessel is made of acid-resistant steel or is enamelled; the nozzles are made of a synthetic material. A granular aggregate is formed of a pyrophosphate peroxyhydrate containing about 1 mol $H_2O_2$ for 1 mol $Na_4P_2O_7$. The granular substance can be separated by a sifting process into grain-sizes of 0.5 mm. and over, and into those 0.2 to 0.5 mm. The remaining dust-like portion is very small.

(2) 89 parts by weight of tetra-sodium pyrophosphate are mixed with 4.4 parts by weight of sodium bicarbonate and 5.5 parts by weight of a finely powdered magnesium silicate, and sprayed with 76 parts by weight of a 30% hydrogen peroxide solution, containing 6 parts by weight of approximately 74% phosphoric acid. By simultaneously blowing in cold air, the heat formed is removed. In this spraying process lasting about 4 hours, a dry pyrophosphate peroxyhydrate is formed, containing about 2 mols $H_2O_2$ for 1 mol $Na_4P_2O_7$.

(3) Instead of the 100 parts by weight of tetra-sodium pyrophosphate used in Example 1, 70 parts by weight are used of a mixture of equal parts of disodium- and tetrasodium pyrophosphates and 30 parts by weight of sodium tripolyphosphate. A mixture can also be used consisting of equal parts of pyrophosphate, tripolyphosphate and a powdered fused mixture, corresponding in its average composition to a hexa- or hepta-polyphosphate.

(4) 100 parts by weight of tetrasodium pyrophosphate, and 42 parts by weight of disodium pyrophosphate are mixed together with 2.8 parts by weight of a magnesium silicate, and sprinkled with 50 parts by weight of a 30% hydrogen peroxide solution in a rapidly operating mixer. A pyrophosphate peroxyhydrate is obtained, containing about 8.2% $H_2O_2$.

(5) 100 parts by weight of tetrasodium pyrophosphate, 82 parts by weight of disodium pyrophosphate and 3.6 parts by weight of a sodium salt of ethylene diamine tetra-acetic acid are mixed in a rapidly operating mixer with 65 parts of a 30% hydrogen peroxide solution which is sprinkled on. A pyrophosphate peroxyhydrate is obtained, containing about 8.1% of $H_2O_2$.

10 g. of the usual commercial sodium pyrophosphate peroxyhydrate in a finely powdered state, obtained by the wet method, requires 2 to 3 minutes in order to dissolve in 1 litre of water at 20°. The granular aggregates prepared according to Examples 1 and 3 are by contrast, dissolved in 50 to 60 seconds under similar conditions, while the granular aggregate prepared according to Example 2, requires only 30 to 50 seconds to be dissolved. Various persalt-free washing- and cleaning-agents in a hollow spherical state, were dissolved under similar conditions in 40 to 90 seconds. The granular aggregates of the phosphate peroxyhydrate manufactured according to the invention possess therefore greater or equal speeds of solution, than the hollow spherical sprayed washing- and cleaning-agents, while as regards speed of solution they even surpass that of the washing- and cleaning-granules. The granules manufactured according to the invention are therefore ideally suited for the production of washing-, cleaning- and bleaching-agents which cannot be separated into their components, and which consist of a mixture of persalt-free hollow spherical or granular ingredients together with phosphate peroxyhydrate granules.

In order to further stabilize the granules, the latter can be coated with a thin, say monomolecular layer of fatty compounds either during or after the granulation-, sorting- or sifting process. The following are suitable for this purpose, for example paraffin oil, fatty oils, fatty acid amides, fatty acid ethanol amide, fatty acid polyglycol ester, alkyl polyglycol ether, alkyl phosphates or such like. This greasing process of the granules is also effected by means of spraying with an extremely fine jet of the fatty substance.

What is claimed as new and desired to be secured by Letters Patent is:

1. Method of making granulated alkali metal molecularly dehydrated phosphate peroxyhydrate comprising spraying a mass of finely divided substantially anhydrous alkali metal molecularly dehydrated phosphate with a solution of hydrogen peroxide, simultaneously mixing said phosphate and said hydrogen peroxide solution, and recovering the granulated product having an average thickness of about 0.1 mm. to about 1 mm. and having bound in an additive manner about 0.5 mol to about 2.5 mols of $H_2O_2$ for each mol of alkali metal molecularly dehydrated phosphate.

2. A granulated product having an average thickness of about 0.1 mm. to about 1 mm., made by the process of spraying a finely divided substantially anhydrous alkali metal molecularly dehydrated phosphate with a solution of hydrogen peroxide, simultaneously mixing said phosphate and the hydrogen peroxide solution sprayed thereon, and recovering the product, said product having bound in an additive manner about 0.5 mol to about 2.5 mols of $H_2O_2$ for each mol of alkali metal molecularly dehydrated phosphate.

3. Method of making granulated alkali metal molecularly dehydrated phosphate peroxyhydrate comprising spraying a mass of finely divided substantially anhydrous alkali metal molecularly dehydrated phosphate with a solution of hydrogen peroxide containing a stabilizer selected from the group consisting of manganesium sulfate, magnesium metasilicate, magnesium polysilicate, and alkaline salts of amino-polycarboxylic acids, simultaneously mixing said phosphate and said hydrogen peroxide solution, and recovering the granulated product having an average thickness of about 0.1 mm. to about 1 mm. and having bound in an additive manner about 0.5 mol to about 2.5 mols of $H_2O_2$ for each mol of alkali metal molecularly dehydrated phosphate.

4. A granulated product having an average thickness of about 0.1 mm. to about 1 mm., made by the process of spraying a finely divided substantially anhydrous alkali metal melocularly dehydrated phosphate with a solution of hydrogen peroxide containing a stabilizer selected from the group consisting of magnesium sulfate, magnesium metasilicate, magnesium polysilicate, and alkaline salts of amino-polycarboxylic acids, simultaneously mixing said phosphate and the hydrogen peroxide solution sprayed thereon, and recovering the product, said product having bound in an additive manner about 0.5 mol to about 2.5 mols of $H_2O_2$ for each mol of alkali metal molecularly dehydrated phosphate.

References Cited in the file of this patent
UNITED STATES PATENTS

| | | |
|---|---|---|
| 1,914,312 | Viewig | June 13, 1933 |
| 2,141,189 | Lind | Dec. 27, 1938 |
| 2,491,732 | Hawkinson et al. | Dec. 20, 1949 |

OTHER REFERENCES

H. Menzel and C. Gabler: Z. Anorg. u. Allgem. Chem. 177 (1928).

H. Menzel and C. Gabler, Z. Anorg. Chem. 177, 187 (1929).

P. Bonneman-Bemia, Ann. Chim. 16, 395 (1941) (especially pages 470–474).

Hydrogen peroxide, Schumb et al., Reinhold Publ. Corp., N.Y., 1955, chapters 7 and 12, specifically.